(12) United States Patent
Cretella et al.

(10) Patent No.: US 12,211,401 B2
(45) Date of Patent: Jan. 28, 2025

(54) IDENTIFICATION SYSTEM FOR RECESSED FLOOR FITTING

(71) Applicant: Hubbell Incorporated, Shelton, CT (US)

(72) Inventors: Joseph N. Cretella, Ansonia, CT (US); Scott B. Wurms, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/598,667

(22) Filed: Mar. 7, 2024

(65) Prior Publication Data

US 2024/0212529 A1 Jun. 27, 2024

Related U.S. Application Data

(63) Continuation of application No. PCT/US2022/045302, filed on Sep. 30, 2022.

(60) Provisional application No. 63/251,350, filed on Oct. 1, 2021.

(51) Int. Cl.
*G09F 3/20* (2006.01)
*H02G 3/18* (2006.01)

(52) U.S. Cl.
CPC ............ *G09F 3/205* (2013.01); *H02G 3/185* (2013.01)

(58) Field of Classification Search
CPC ................................. H02G 3/185; G09F 3/205
See application file for complete search history.

(56) References Cited

U.S. PATENT DOCUMENTS

| | | | | |
|---|---|---|---|---|
| 1,930,610 A | * | 10/1933 | Despard | G09F 3/18 40/642.02 |
| 4,529,833 A | * | 7/1985 | Weis | H02G 3/185 52/220.4 |
| 4,554,771 A | * | 11/1985 | Marwah | H02G 3/185 52/220.4 |
| 4,618,203 A | * | 10/1986 | Greenwood | H01R 13/648 439/406 |
| 4,627,684 A | * | 12/1986 | D'Amato | H01R 12/613 439/535 |
| 4,756,106 A | * | 7/1988 | Foster | G09F 21/04 40/594 |
| 5,212,899 A | * | 5/1993 | Fandreyer | G09F 3/20 40/661.11 |
| 5,455,388 A | * | 10/1995 | Pratt | H02G 3/185 174/67 |
| 5,613,874 A | * | 3/1997 | Orlando | H01R 13/465 40/607.13 |
| 5,735,708 A | * | 4/1998 | Arnett | H05K 5/0252 174/66 |

(Continued)

OTHER PUBLICATIONS

International Search Report and Written Opinion issued on Dec. 23, 2022, by the International Searching Authority in corresponding International Patent Application No. PCT/US2022/045302. (12 pages).

*Primary Examiner* — David R Dunn
*Assistant Examiner* — Christopher E Veraa
(74) *Attorney, Agent, or Firm* — Robinson + Cole LLP

(57) ABSTRACT

An identification system, for use with a recessed floor box that provides access to one or more wiring devices, includes a label holder configured to couple with a plate mounted in the recessed floor box and a label removably stored in the label holder. The label includes information about the one or more wiring devices.

30 Claims, 10 Drawing Sheets

(56) References Cited

U.S. PATENT DOCUMENTS

| | | | | |
|---|---|---|---|---|
| 5,977,481 A * | 11/1999 | Worrell | | H02G 3/14 |
| | | | | 220/241 |
| 6,215,067 B1 * | 4/2001 | Chen | | H02G 3/14 |
| | | | | 220/241 |
| 6,421,941 B1 * | 7/2002 | Finke | | G09F 7/18 |
| | | | | 40/611.05 |
| 6,593,530 B2 * | 7/2003 | Hunt | | H01H 9/18 |
| | | | | 200/309 |
| 6,718,674 B2 * | 4/2004 | Caveney | | H01R 13/465 |
| | | | | 40/642.02 |
| 6,908,334 B2 * | 6/2005 | Huang | | H01R 25/003 |
| | | | | 439/491 |
| 7,205,488 B2 | 4/2007 | Riner | | |
| 7,395,623 B2 * | 7/2008 | Park | | A01K 1/031 |
| | | | | 40/308 |
| 7,740,282 B2 * | 6/2010 | McNutt | | H04Q 1/136 |
| | | | | 283/117 |
| 8,650,786 B2 * | 2/2014 | Trigg | | G09F 3/12 |
| | | | | 40/1.5 |
| 9,735,558 B1 * | 8/2017 | Gretz | | H01R 13/5202 |
| 2003/0163940 A1 * | 9/2003 | Mautz | | G09F 3/204 |
| | | | | 40/661.11 |
| 2006/0249306 A1 | 11/2006 | Dinh | | |
| 2008/0141575 A1 * | 6/2008 | Keating | | G09F 3/204 |
| | | | | 40/661.11 |
| 2008/0264664 A1 * | 10/2008 | Dinh | | H02G 3/185 |
| | | | | 174/50 |
| 2008/0264667 A1 * | 10/2008 | Dinh | | H02G 3/185 |
| | | | | 174/53 |
| 2008/0276513 A1 * | 11/2008 | Jose | | G09F 3/14 |
| | | | | 40/310 |
| 2009/0194312 A1 * | 8/2009 | Jolly | | H02G 3/185 |
| | | | | 174/67 |
| 2012/0024966 A1 * | 2/2012 | Vanderwel | | G06K 19/0723 |
| | | | | 235/492 |
| 2012/0042550 A1 | 2/2012 | Chang et al. | | |
| 2012/0049022 A1 * | 3/2012 | Coyle | | E04B 1/38 |
| | | | | 248/220.21 |
| 2013/0023149 A1 * | 1/2013 | Galasso | | H02G 3/185 |
| | | | | 439/527 |
| 2014/0317978 A1 * | 10/2014 | Kim | | H02G 3/14 |
| | | | | 40/299.01 |
| 2016/0308340 A1 * | 10/2016 | Scanzillo | | H02G 3/085 |
| 2016/0359308 A1 * | 12/2016 | Vezina | | H05K 5/0204 |
| 2017/0063062 A1 * | 3/2017 | Debartolo | | H02G 3/185 |
| 2019/0280470 A1 * | 9/2019 | Jolly | | H01H 36/0006 |

* cited by examiner

IDENTIFICATION SYSTEM FOR RECESSED FLOOR FITTING

CROSS-REFERENCE TO RELATED APPLICATIONS

This application is a Continuation of PCT Application No. PCT/US2022/045302, filed Sep. 30, 2022, which claims priority to U.S. Provisional Patent Application No. 63/251,350, filed Oct. 1, 2021, the entire contents of which are all hereby incorporated by reference.

FIELD

Various exemplary embodiments relate to recessed floor fittings to house any combination of electrical, data, communication, audio, and visual connections. An identification system is used to identify which type or types of connections are housed in the recessed floor fitting.

SUMMARY

Different housings have been developed to house electrical, data, communication, audio, and visual connections recessed in a floor or a sub-floor. Often the housings contain connections of different types which are visually similar and can be difficult to distinguish. At times, this can cause confusion to technicians and users. It would be advantageous to have a way to clearly identify the connection type of each connection.

In one aspect, the disclosure provides a subplate for use in a recessed floor fitting. The subplate includes a main plate extending along a longitudinal axis, a port positioned in the main plate and configured to support at least one wiring device in the recessed floor fitting, and a knock out positioned in the main plate and including a removable center portion. The subplate further includes an identification system for identifying the wiring device supported in the port. The identification system includes a label holder coupled to the main plate and a label removably received in the label holder.

In another aspect, the disclosure provides an identification system, for use with a recessed floor box that provides access to one or more wiring devices. The system includes a label holder configured to couple with a plate mounted in the recessed floor box and a label removably stored in the label holder. The label includes information about the one or more wiring devices.

Other aspects of the application will become apparent by consideration of the detailed description and accompanying drawings.

DETAILED DESCRIPTION OF EXEMPLARY EMBODIMENTS

Figure 1:
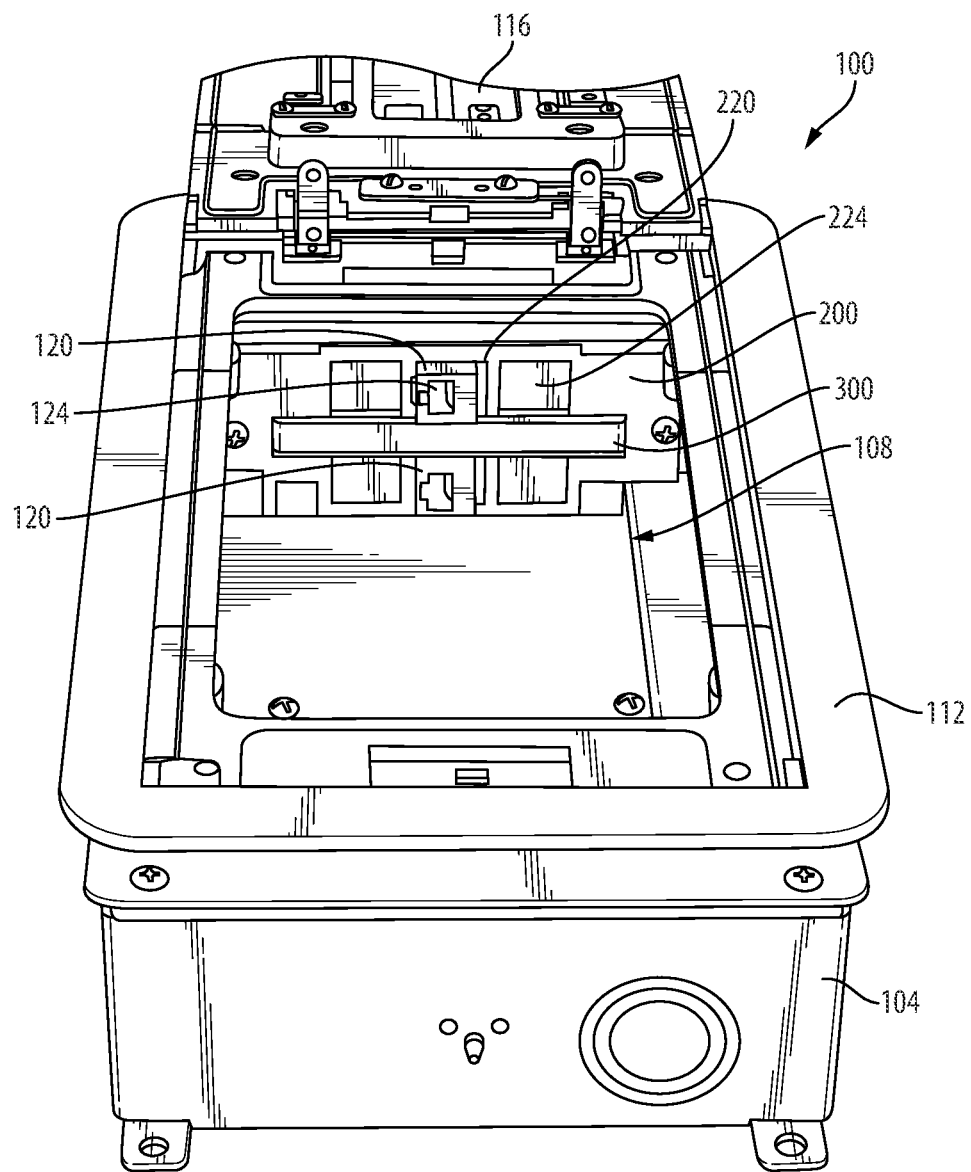
FIG. 1 is a perspective view of a recessed floor fitting including a subplate with an attached label holder.
Figure 2:
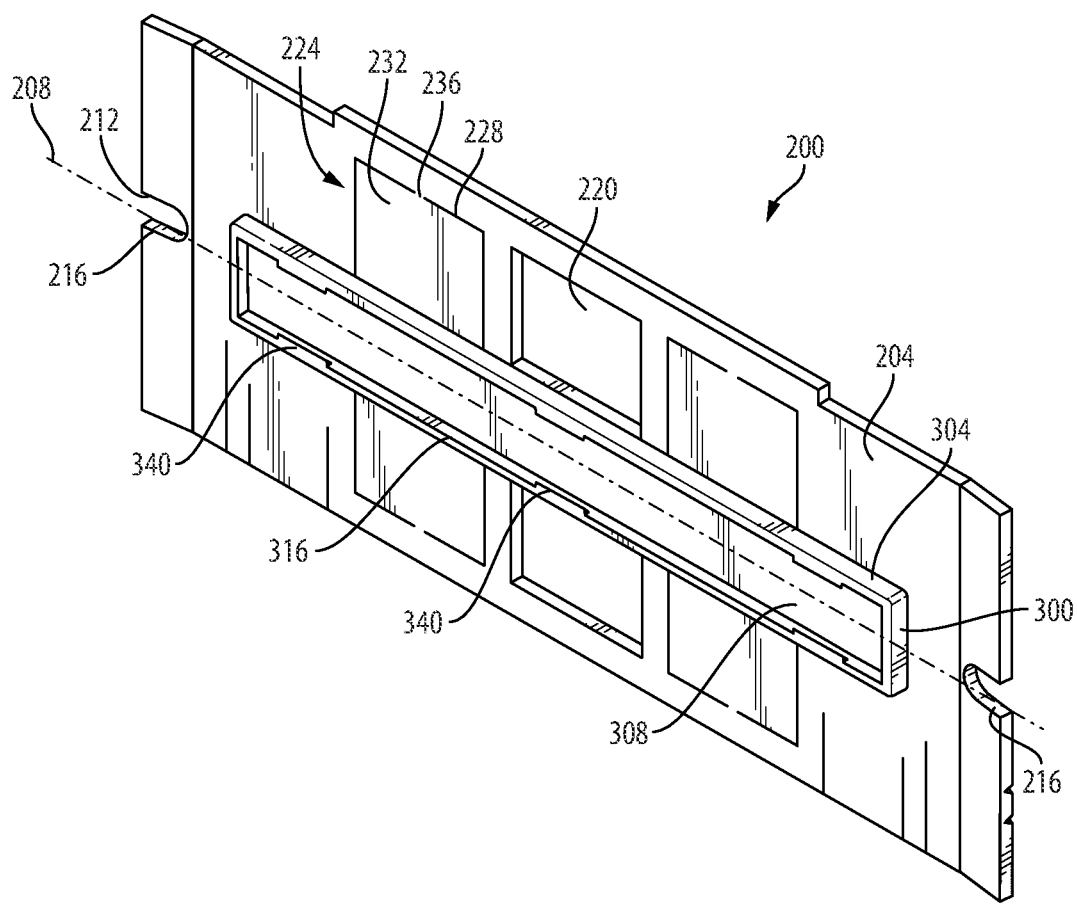
FIG. 2 is a perspective view of the subplate of FIG. 1 with the attached label holder.

FIG. 1 shows an exemplary recessed floor fitting 100 used to provide easy access to different combinations of electrical, data, communication, audio, and visual connections. FIG. 1 illustrates a recessed floor box type housing with a rectangular housing, although in other embodiments, the housing may be triangular, circular, hexagonal, or any similar geometric shape. Different aspects described in this disclosure can be associated with other housings, including other types of floor boxes and poke-through housings. As described above, the connections accessed through the floor box can appear visually similar but perform different functions. In some cases, users or technicians have attempted to mark the connection types of connections using a standard label maker. However, past floor fittings often have limited space and the placement of such labels can be confusing to a user.

FIG. 1 shows a fitting 100 having a housing 104 defining a cavity 108 and a flange 112 coupled to the housing 104 above the cavity 108. A cover 116 is hingedly coupled to the flange 112 to selectively enclose the cavity 108. One or more wiring devices 120 are accessible through the fitting 100. The wiring devices 120 may include jacks 124, electrical outlets, or other connections. The illustrated fitting 100 includes a subplate 200 mounted in the cavity 108 for supporting the wiring devices 120. An identification system 300 may be coupled to the subplate 200.

As shown in FIGS. 2-5, in the illustrated embodiment, the fitting 100 includes a subplate 200 for supporting wiring devices 120. The wiring devices 120 supported by the subplate may be jack connections of different types, for example: communication jacks, telecommunication jacks, data jacks, or power jacks. The subplate 200 includes a main plate 204 extending along a longitudinal axis 208. The main plate 204 is generally rectangular and includes mounting features 212 for coupling the subplate 200 to the housing 104. In the illustrated embodiment the mounting features 212 include notches 216 on either end of the main plate 204. In other embodiments the mounting features 212 may include apertures or other appropriate features.

The subplate 200 may include one or more ports 220 (also referred to herein as access openings 220) and one or more knock outs 224. Each port 220 is shaped to receive and support a wiring device 120. The knockouts 224 are formed by one or more slits 228 in the main plate 204 creating a center portion 232 which is attached to the main plate 204 by thin bridges 236. Force can be applied to the center portion 232 to snap the thin bridges 236 disconnecting the center portion 232 from the main plate 204. The knockout 224 can then be removed from the main plate 204, creating an additional port. In the illustrated embodiment the main plate 204 includes two ports 220 and four knock outs 224 arranged in a two-gang configuration. In other embodiments other numbers and other arrangements of ports and knock outs may be used.

Figure 3:
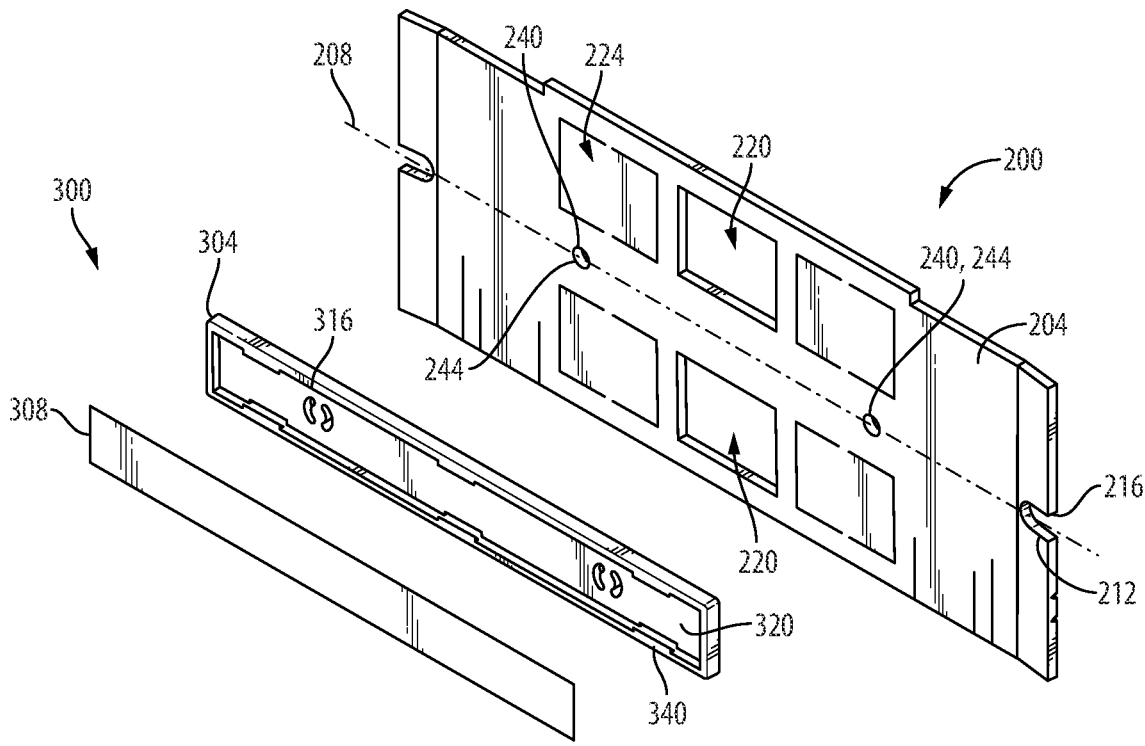
FIG. 3 is a front exploded view of the subplate and label holder of FIG. 2.
Figure 4:
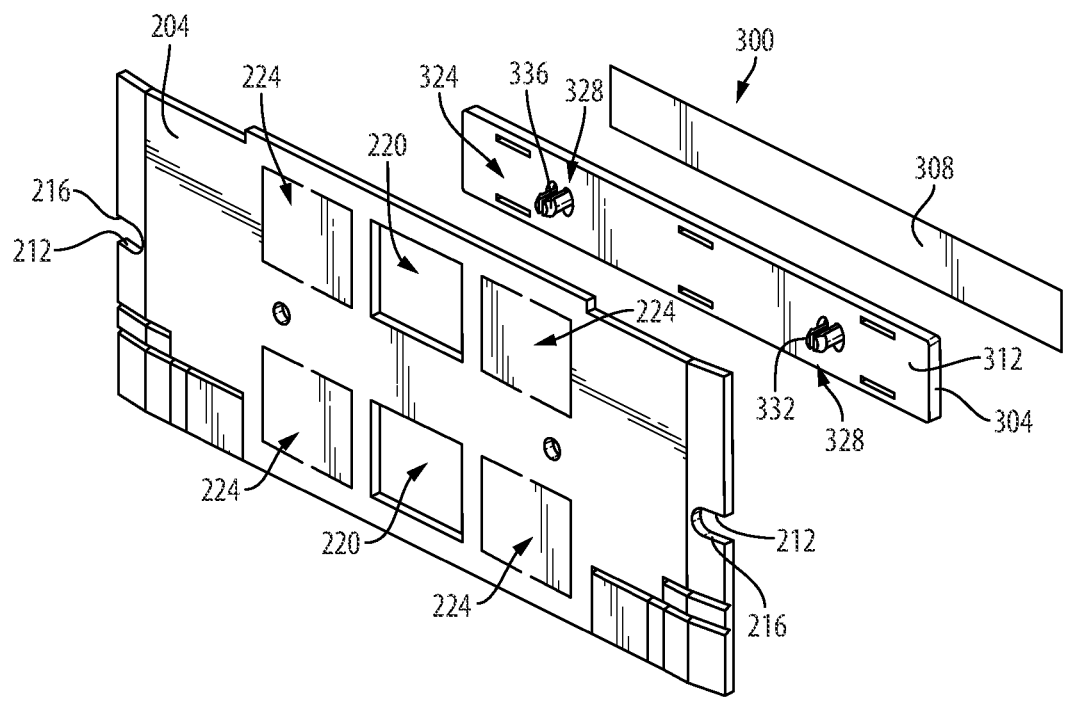
FIG. 4 is a rear exploded view of the subplate and label holder of FIG. 2.

As shown best in FIGS. 3-4, an identification system 300 is coupled to the subplate 200. In the illustrated embodiment, the identification system 300 includes a label holder 304 and a label 308. The label holder 304 includes a rear surface 312, a front edge 316, and a recessed surface 320 surrounded by the front edge 316. A connection interface 324 is positioned on the rear surface 312 of the label holder 304 for engaging connection features 240 positioned on the main plate 204 of the subplate 200. In the illustrated embodiment the label holder 304 is coupled to the main plate 204 through a snap fit connection. The connection interface 324 of the label holder 304 includes a pair of posts 328 extending from the rear surface 312.

Each post 328 includes two resilient halves 332 forming a tapered head 336. The connection features 240 of the main plate 204 include a pair of apertures 244 configured to receive the posts 328. As the posts 328 are received in the apertures 244, the edge of the aperture 244 engages the tapered head 336 to push the resilient halves 332 inward. Once the tapered head 336 passes through the aperture 244 then the resilient halves 332 are returned to their original positions such that the tapered heads 336 act as stops, securing the label holder 304 to the main plate 204. While the illustrated embodiment utilizes a snap fit connection as described, other connections are also contemplated. For example, the label holder 304 may be coupled to the main plate via screws, nuts and bolts, magnets, a sliding connection such as a tongue in groove connection, and any other connection method known to secure two parts together.

Figure 5:
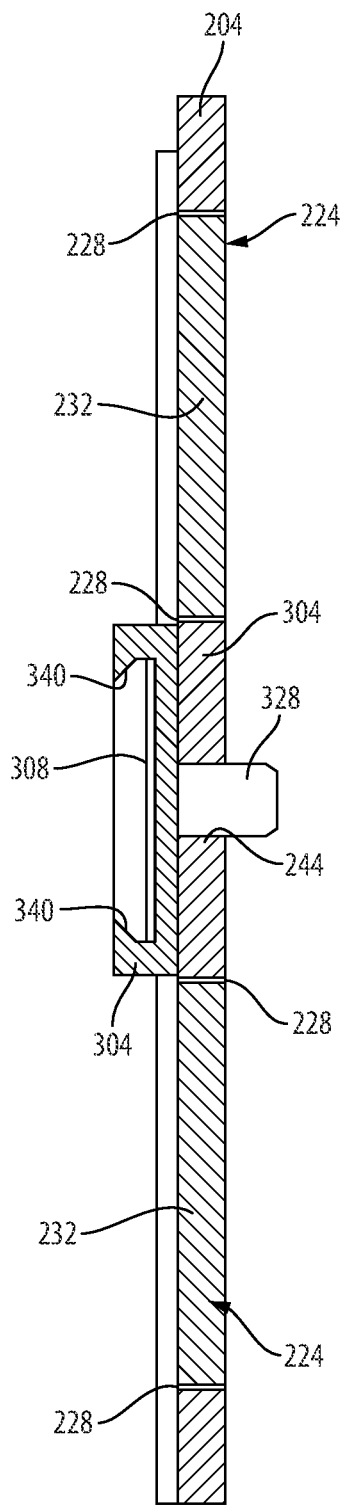
FIG. 5 is a cross section of the subplate and label holder of FIG. 2.

The identification system 300 includes the label 308 which may be slidably received against the recessed surface 320 of the label holder 304, within the front edge 316. The label holder 304 may include tabs 340 extending from the front edge 316. When the label 308 is positioned in the label holder 304, the label 308 may be held against the recessed surface 320 by the tabs 340, as best shown in FIG. 5. The label 308 provides an easy way to identify the wiring devices 120 supported by the subplate 200. In some embodiments the label 308 may be a piece of paper or paper slip with ink markings, such as printed information. The label 308 may also be a piece of paper with handwritten information. In some embodiments, the label 308 may be a piece of metal or plastic with information embossed in the surface. The label 308 may also receive stickers, or other identifiers. The label 308 may be received in a plastic sleeve (not shown) to prevent any wear or damage of the information. The information provided on the label 308 may include the type of connection supported (e.g. telecommunication, data, power) or may also or alternately include the model number, the power rating, voltage, wattage, or any other information about the supported wiring device 120. In some embodiments, the label 308 may include information about multiple wiring devices. For example, the label 308 a first indicia corresponding to a first wiring device 120 and a second indicia corresponding to a second wiring device 120. The first and second indicia may be located on the label 308 so that when the label 308 is received by the label holder 304, the first indicia is adjacent the first wiring device 120 and the second indicia is adjacent the second wiring device. In other embodiments, the first indicia may be positioned somewhere on the label corresponding to the first wiring device 120, but not necessarily adjacent. In other embodiments, position of each of the indicia may not be related to the position of the wiring devices 120, but the indicia may include information that indicates which wiring device the provided information applies to.

In the illustrated embodiment, the label holder 304 is fixed to the subplate 200 between the gangs so that the label 308 can provide information about both gangs. In other embodiments the subplate 200 may include multiple connection features 240 and may couple to multiple label holders 304 to provide information about the gangs separately.

The floor fitting 100 is installed in the floor by a technician. As part of the installation the subplate 200 is installed in the fitting 100 to support the wiring devices 120. In use, the subplate 200 may be installed with the identification system 300 in place, or it may be added after. Once the wiring devices 120 have been installed, the label 308 may be removed and marked with the relevant information and then replaced in the label holder 304. Either during installation of the floor fitting 100, or at some point afterwards, additional wiring devices 120 may be desired. In such cases pressure may be applied to a knockout 224 of the subplate 200 to remove it from the main plate 204, creating an additional port. An additional wiring device may be installed in the port. The label 308 may be removed and information about the additional wiring device may be added. The label 308 may then be replaced in the label holder 304. Over time, the wiring devices 120 may also be replaced or changed out. In such cases the label 308 can be removed, and the outdated information removed, covered, or otherwise obscured, and may be replaced with the updated information. Alternately, the label 308 may be discarded and a replacement label 308 with the relevant information may be placed in the label holder 304.

Figure 6:
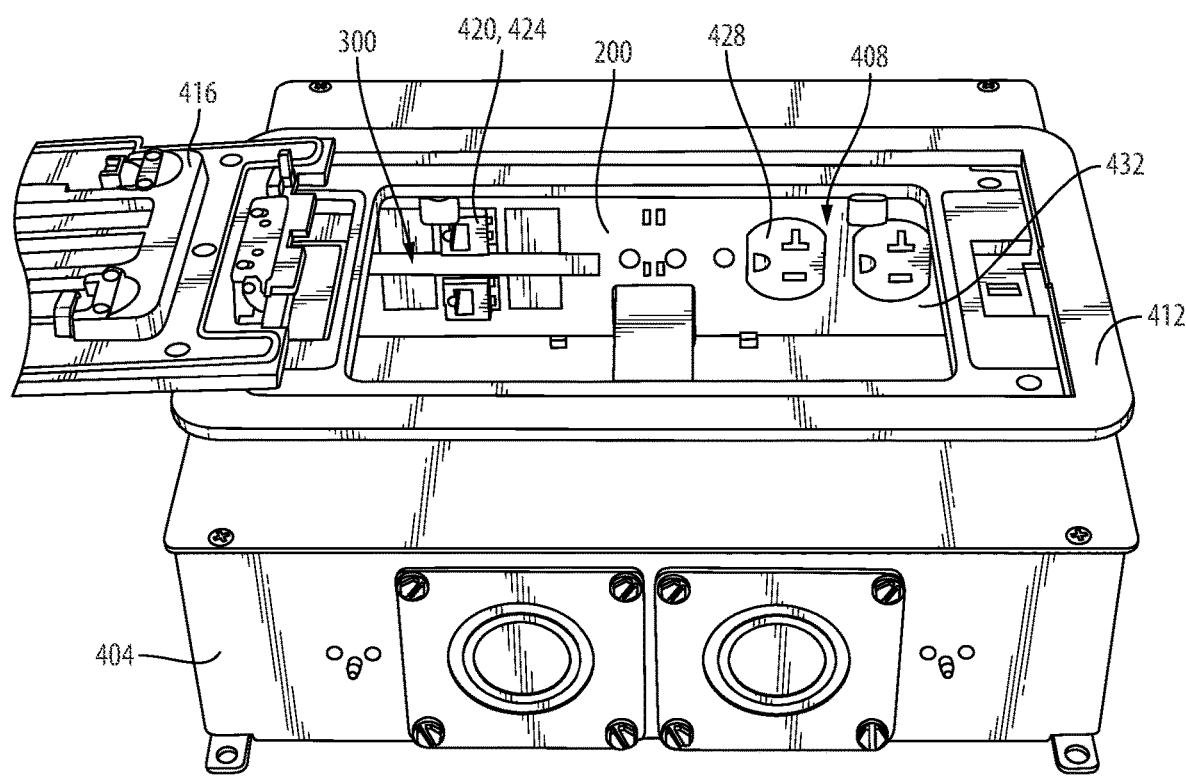
FIG. 6 is a perspective view of a second embodiment of a recess floor fitting for use with the subplate and label holder of FIG. 2.

FIG. 6 illustrates the identification system 300 in use with another embodiment of a recessed floor fitting 400. The floor fitting 400 includes a housing 404 defining a cavity 408, a flange 412, and cover 416. Wiring devices 420 are received in the cavity 408 including electrical outlets 428 and jacks 424. The floor fitting 400 may use the same subplate 200 as described above. The subplate 200 is positioned in the recess floor fitting 400 on a sidewall 432 of the housing 104. In other embodiments, the subplate 200 may be positioned in other locations within the fitting 400.

Figure 7:
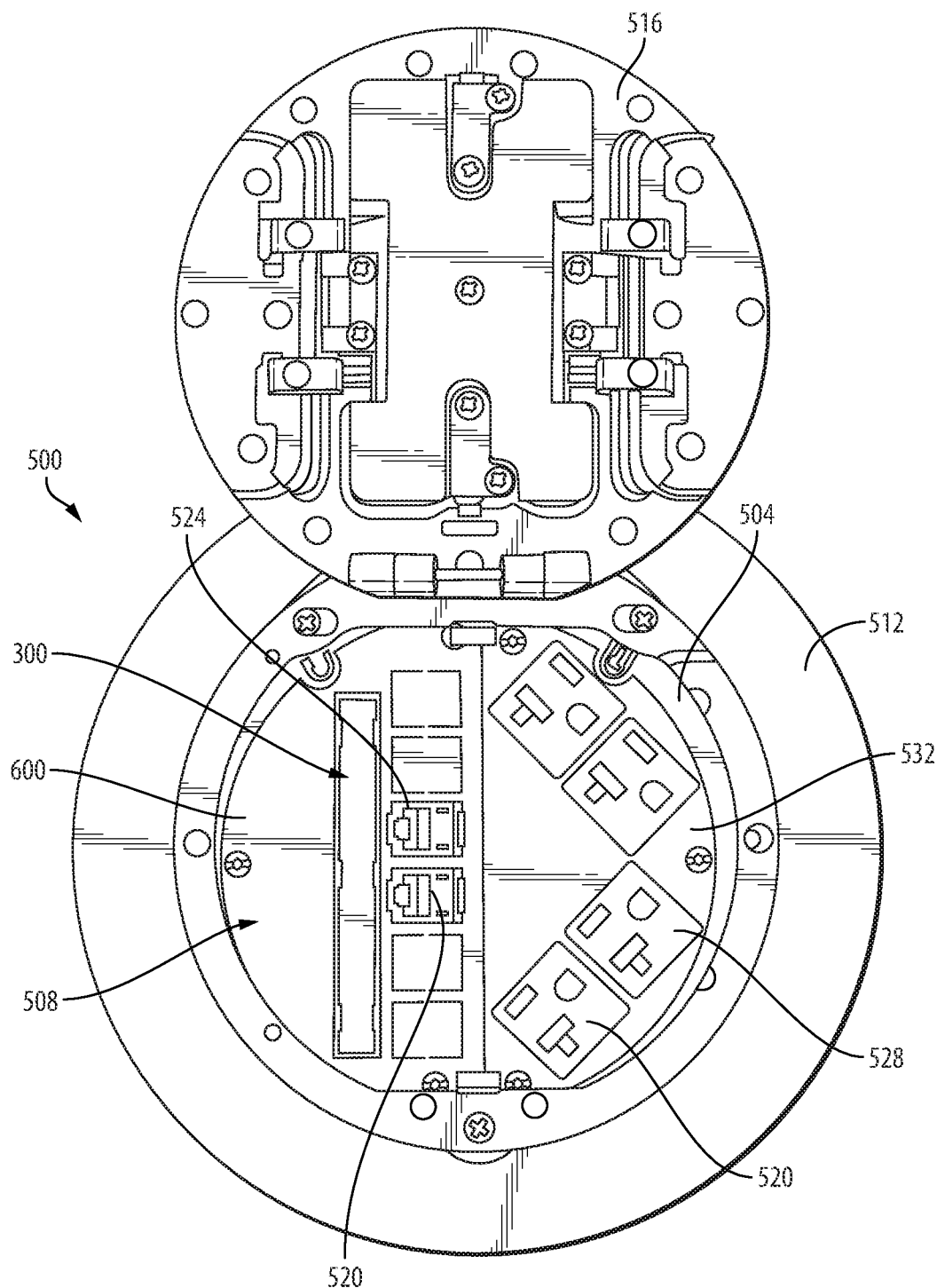
FIG. 7 is a top view of a third embodiment of a recessed floor fitting including a second embodiment of a subplate with the label holder.
Figure 8:
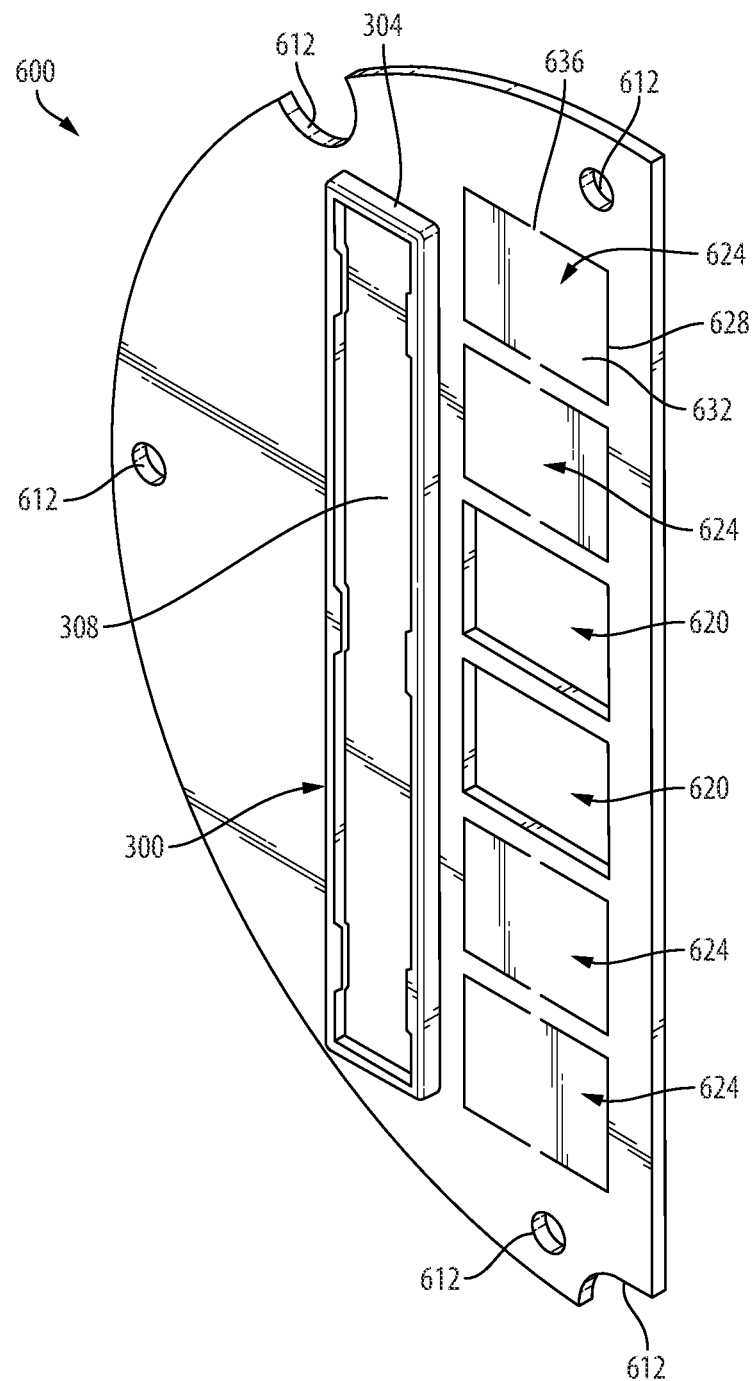
FIG. 8 is a perspective view of the subplate and label holder of FIG. 7.

FIGS. 7-8 illustrate the identification system 300 in use with another embodiment of a floor fitting 500. The floor fitting 500 is illustrated as a 6-inch recessed fire rated poke through floor fitting. The floor fitting 500 includes a housing 504 defining a cavity 508, a flange 512 positioned above the cavity 508, and a cover 516 coupled to the housing 504 to selectively enclose the cavity 508. The fitting 500 includes a first plate 532 positioned in the cavity with a plurality of wiring devices 520 formed as electrical outlets 528, and a subplate 600 positioned within the cavity 508 for supporting wiring devices 520 formed as jacks 524. In the illustrated embodiment the subplate 600 is positioned generally parallel to the flange 512, however, in other embodiments, the subplate 600 may be positioned in alternate orientations.

With reference to FIG. 8, the subplate 600 is similar to the subplate 200 and like features are identified with like reference numerals plus 400. The subplate 600 includes a main plate 604 with two ports 620 and four knockouts 624. The ports 620 and knockouts 624 are arranged in a single gang configuration. The knockouts 624 include center portions 632 separated from the main plate 604 by thin slits 628 and are supported on the main plate 604 by thin bridges 636. The label holder 304 is positioned adjacent the gang. The main plate 604 is generally semicircular and includes mounting features 612, e.g. notches and apertures, for mounting the subplate 600 to the floor fitting 500. The subplate 600 is coupled to the identification system 300 using a snap fit connection, as described above.

Figure 9:
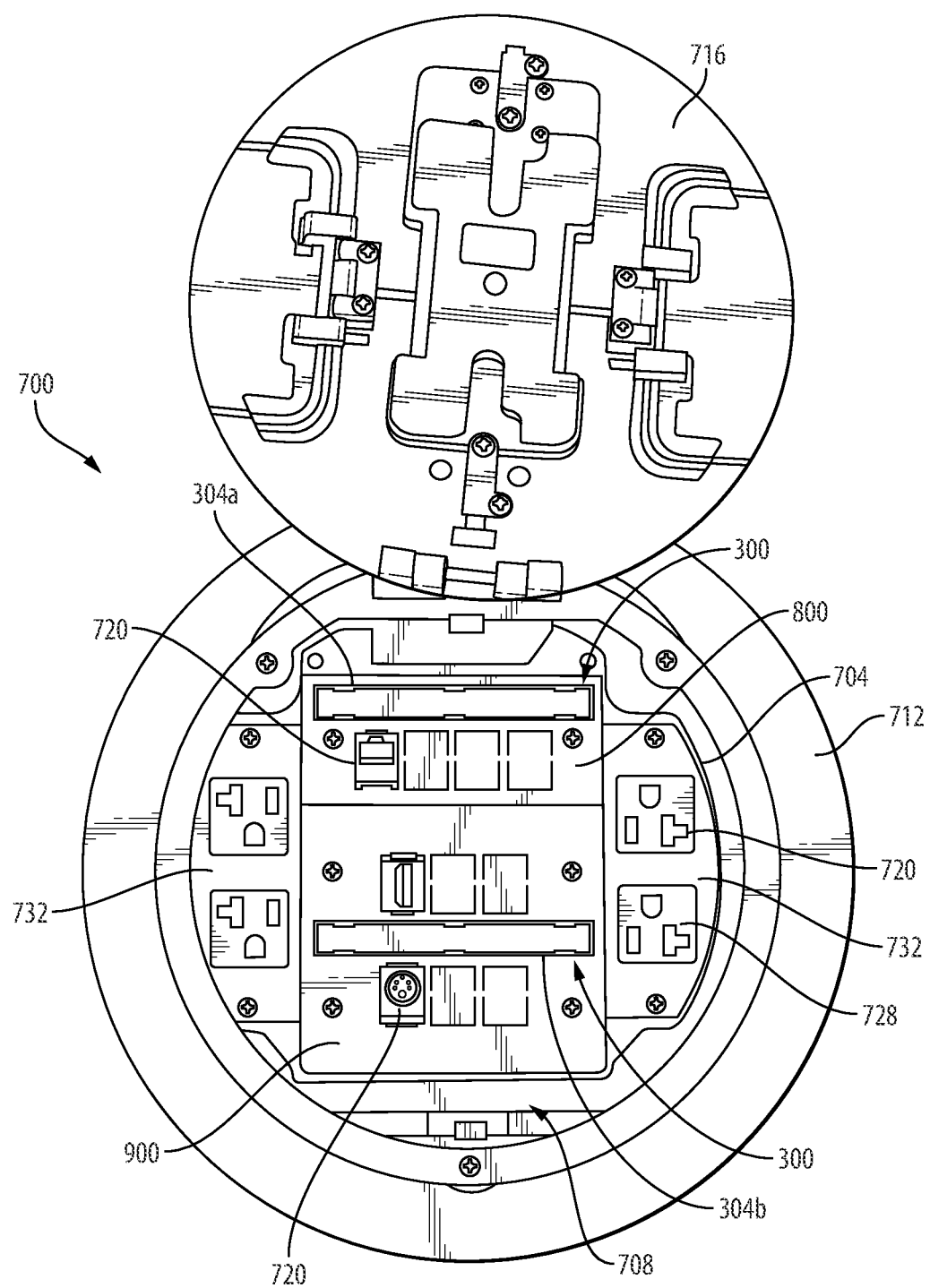
FIG. 9 is a top view of fourth embodiment of a recessed floor fitting including a third embodiment of a subplate and a fourth embodiment of a subplate each with an attached label holder.
Figure 10:
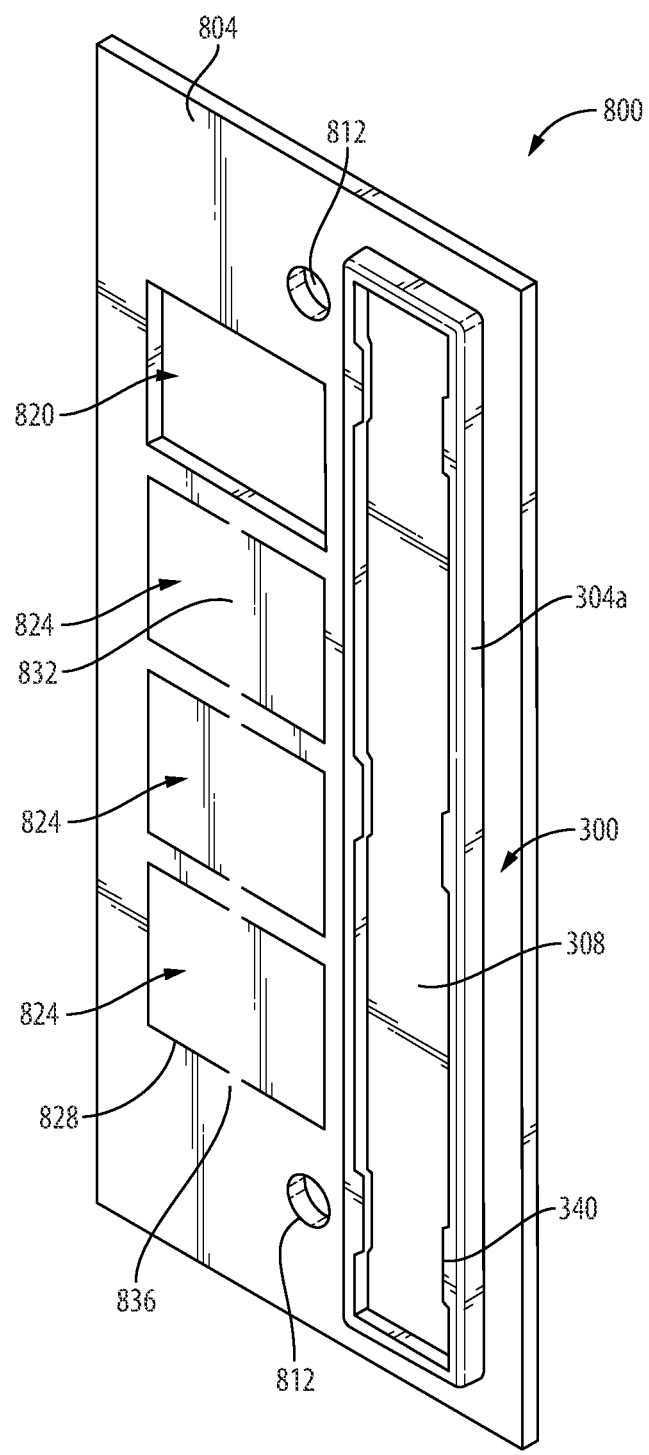
FIG. 10 is a perspective view of the third embodiment of a subplate and label holder of FIG. 9.
Figure 11:
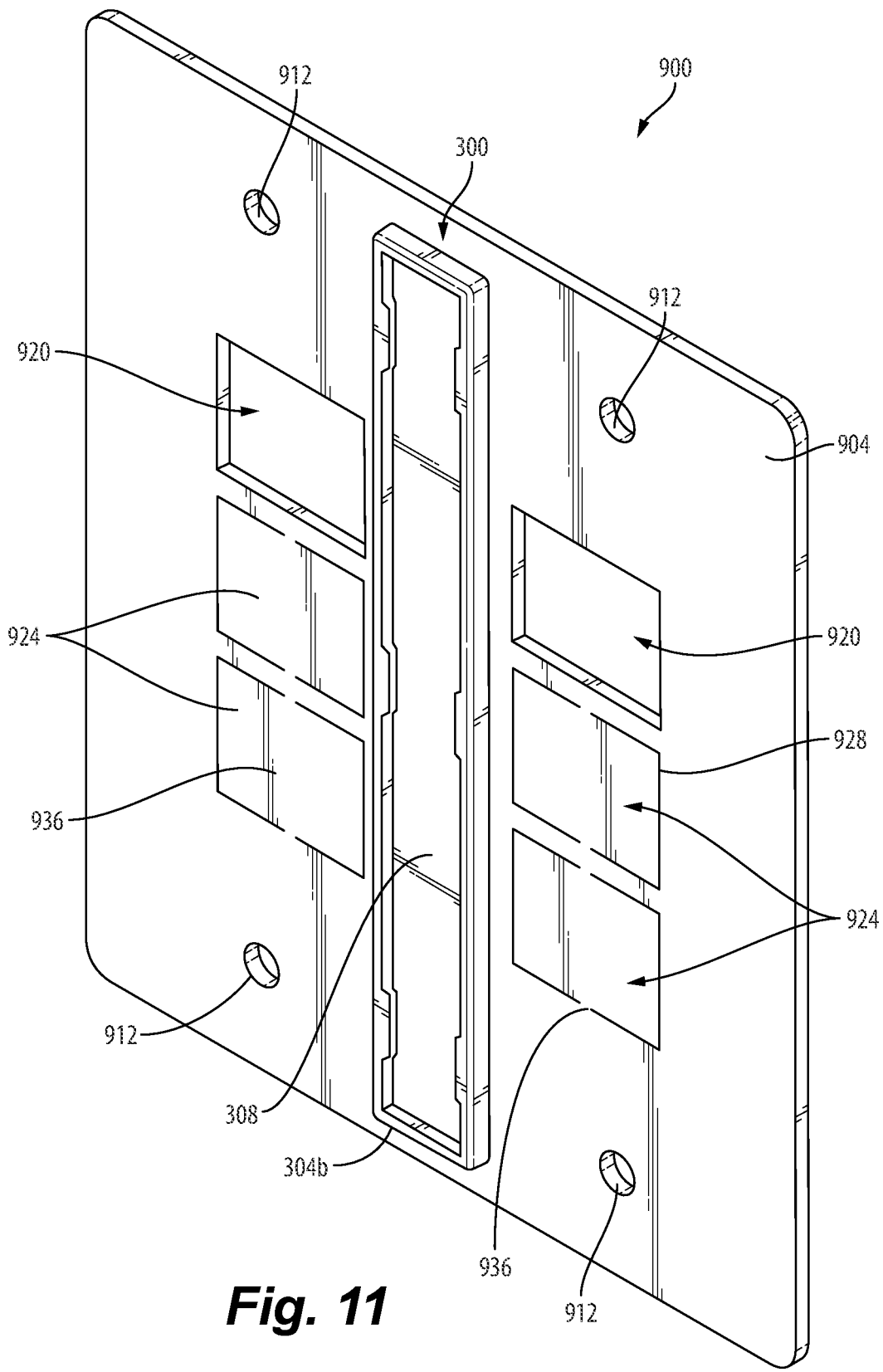
FIG. 11 is a perspective view of the fourth embodiment of a subplate and label holder of FIG. 10.

FIGS. 9-11 illustrate the identification system 300 in use with another embodiment of a floor fitting 700. The floor fitting 700 is illustrated as an 8-inch recessed fire rated poke through fitting. The floor fitting 700 includes a housing 704 defining a cavity 708, a flange 712, and a cover 716 coupled to the flange 712 to selectively enclose the cavity 708. The fitting 700 also includes a pair of plates 732 positioned in the cavity 708 to support wiring devices 720 and specifically to support electrical outlets 728. The fitting 700 includes a first subplate 800 and a second subplate 900 for supporting wiring devices 720.

As shown in FIG. 10, the first subplate 800 is generally similar to the subplate 200 and similar features are assigned similar reference numerals plus 600. The subplate 800 includes one port 820 and three knockouts 824 arranged in a single gang configuration. The subplate 800 is generally rectangular and includes mounting features 812 (e.g. apertures) for mounting the subplate 800 in the cavity 708. A first label holder 304a of the identification system 300 is coupled to the subplate 800 using a snap fit connection as described above. In other embodiments the identification system 300 may be coupled to the subplate 800 in other ways.

As shown in FIG. 11, the second subplate 900 is also similar to the subplate 200 and like features and identified with like reference numerals plus 700. The subplate 900 includes a rectangular main plate 904 having mounting features 912 (e.g. apertures) for connecting the subplate 900 to the floor fitting 700. The main plate 904 includes two ports 920 and four knockouts 924 arranged in a two-gang configuration. A second label holder 304b of the identification system 300 is coupled to the main plate 904 using a snap fit connection, as described above. In other embodiments, other connections may be used.

Accordingly, a user can install the fitting, make the required connections, and install initial wiring devices and the identification system with the initial information. Later, another user can later install additional wiring devices and can add to or replace the information in the identification system. Thus, the identification system provides a straightforward way to communicate the type of connections stored in a fitting.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A subplate for use in a recessed floor fitting, the subplate including:
    a main plate having a planar body extending along an axis between a first end and a second end, wherein the main plate includes a notch at the first end, the notch configured to receive a fastener for securing the main plate in the recessed floor fitting;
    a first knock-out positioned in the main plate on a first side of the axis, the first knock out including a first removable center portion configured to expose a first port, wherein the first port is configured to support a first wiring device in the recessed floor fitting;
    a second knock-out positioned in the main plate on a second side of the axis, the second knock out including a second removable center portion configured to expose a second port, wherein the second port is configured to support a second wiring device in the recessed floor fitting;
    an identification system for identifying the at least one electrical device supported in the first port and/or in the second port, the identification system includes:
        a label holder coupled to the main plate along the axis between the first knock out and the second knock out; and
        a label removably received within the label holder.

2. The subplate of claim 1, wherein the label holder is coupled to the main plate through a snap fit connection.

3. The subplate of claim 2, wherein the label holder includes a post with resilient halves forming a tapered head.

4. The subplate of claim 3, further comprising an aperture configured to selectively receive the post, and wherein the tapered head engages the aperture to deflect the resilient halves toward each other, and wherein the resilient halves return to their original positions once the tapered head has passed through the aperture.

5. The subplate of claim 1, wherein the label holder includes a first tab oriented parallel to the axis, a second tab oriented parallel to the axis, and a recessed surface formed between the first tab and the second tab, wherein the first tab and the second tab are configured to hold the label against the recessed surface.

6. The subplate of claim 1, wherein the label is a paper slip and includes a first indicia corresponding to the wiring device to provide information about the wiring device, the first indicia being an ink marking.

7. The subplate of claim 1, further comprising:
    a third knock-out positioned in the main plate on the first side of the axis and aligned with the first knock out, the third knock out including a third removable center portion configured to expose a third port, wherein the third port is configured to support a third wiring device in the recessed floor fitting; and
    a fourth knock-out positioned in the main plate on the second side of the axis and aligned with the second knock out, the fourth knock out including a fourth removable center portion configured to expose a fourth port, wherein the fourth port is configured to support a fourth wiring device in the recessed floor fitting;
    wherein a length of the label holder measured along the axis extends beyond the first knock out and the third knock out.

8. The subplate of claim 1, wherein the main plate is asymmetric about the axis.

9. The subplate of claim 1, wherein the label holder is coupled to the main plate through a magnetic connection.

10. The subplate of claim 1, wherein the main plate includes a side edge that extends parallel to the axis, the side edge includes a first section and a second section, the first section is disposed proximate to the first knockout and the second section is disposed adjacent to the first section, wherein the first region and the first knockout are oriented along a second axis that is perpendicular to the axis, and wherein the first section is disposed further from the axis than the second section as measured in a direction parallel to the second axis.

11. The subplate of claim 1, wherein the notch is disposed along the axis and wherein the notch includes an open perimeter having a substantially semi-circular shape.

12. A subplate for use in a recessed floor fitting, the subplate including:
  a main plate having a planar body that extends along a first axis, wherein the main plate includes a notch oriented along the first axis at a first end of the first surface, the notch configured to receive a fastener for securing the main plate in the recessed floor fitting;
  a knock-out positioned in the main plate, the knock out including a removable center portion configured to expose a port, wherein the port is configured to support a wiring device in the recessed floor fitting; and
  an identification system for identifying the wiring device supported in the port, the identification system includes:
    a label holder directly coupled to the main plate and oriented along the first axis; and
    a label removably received in the label holder.

13. The subplate of claim 12, wherein the label holder is coupled to the main plate through a snap fit connection.

14. The subplate of claim 13, wherein the label holder includes a post with resilient halves forming a tapered head, the subplate further comprising an aperture configured to selectively receive the post, and wherein the tapered head engages the aperture to deflect the resilient halves toward each other, and wherein the resilient halves return to their original positions once the tapered head has passed through the aperture.

15. The subplate of claim 12, wherein the label holder includes a first tab oriented parallel to the axis, a second tab oriented parallel to the axis, and a recessed surface formed between the first tab and the second tab, wherein the first tab and the second tab are configured to hold the label against the recessed surface.

16. The subplate of claim 15, wherein the label holder includes a first wall and a second wall that at least partially form a perimeter of the recessed surface, wherein the first tab and the second tab are oriented perpendicular to the first wall and to the second wall.

17. The subplate of claim 12, wherein the label is a paper slip and includes a first indicia corresponding to the wiring device to provide information about the wiring device, the first indicia being an ink marking.

18. The subplate of claim 12, wherein the label holder is coupled to the main plate through a magnetic connection.

19. A subplate for use in a recessed floor fitting, the subplate including:
  a main plate having a first surface, wherein the main plate includes a notch at a first end of the first surface, the notch includes an open perimeter having a substantially semi-circular shape, the notch configured to receive a fastener for securing the main plate in the recessed floor fitting;
  a first knock-out positioned in the main plate, the first knock out including a first removable center portion configured to expose a first port through the first surface, wherein the first port is configured to support a first wiring device in the recessed floor fitting; and
  an identification system for identifying the wiring device supported in the port, the identification system includes:
    a label holder directly coupled to the first surface, the label holder including a support surface and a tab spaced apart from the support surface, the tab configured to retain a label against the support surface.

20. The subplate of claim 19, further comprising a second knock-out positioned in the main plate, the second knock out including a second removable center portion configured to expose a second port through the first surface, wherein the second port is configured to support a second wiring device in the recessed floor fitting.

21. The subplate of claim 20, wherein the label maker extends along a first axis, and wherein the first knock out and the second knock out are aligned along a second axis parallel to the first axis.

22. The subplate of claim 19, wherein the label holder is coupled to the main plate through a snap fit connection.

23. The subplate of claim 19, wherein:
  the first surface is planar and extends along an axis between a first end and a second end, wherein a center of the notch is disposed along the axis;
  the first knock-out is positioned in the main plate on a first side of the axis;
  a second knock-out positioned in the main plate on a second side of the axis, the second knock out including a second removable center portion configured to expose a second port through the first surface, wherein the second port is configured to support a second wiring device in the recessed floor fitting;
  the label holder extends along the axis between the first knock out and the second knock out; and
  the first surface is asymmetric about the axis.

24. The subplate of claim 19, wherein the label holder is coupled to the main plate through a magnetic connection.

25. A subplate for use in a recessed floor fitting, the subplate including:
  a main plate having a planar body that extends along a first axis, wherein the main plate includes a notch oriented along the first axis at a first end of the first surface, the notch configured to receive a fastener for securing the main plate in the recessed floor fitting;
  a knock-out positioned in the main plate, the knock-out including a removable center portion configured to expose a port, wherein the port is configured to support a wiring device in the recessed floor fitting; and
  an identification system for identifying the wiring device supported in the port, the identification system includes:
    a label holder directly coupled to the main plate along the axis via a magnetic connection along the first axis.

26. The subplate of claim 25, further comprising a second knock-out positioned in the main plate, the second knock out including a second removable center portion configured to expose a second port through the first surface, wherein the second port is configured to support a second wiring device in the recessed floor fitting, and wherein the first knock out and the second knock out and aligned along a second axis parallel to the first axis.

27. The subplate of claim 25, wherein:
- the first knock-out is positioned in the main plate on a first side of the first axis;
- a second knock-out positioned in the main plate on a second side of the first axis, the second knock out including a second removable center portion configured to expose a second port through the first surface, wherein the second port is configured to support a second wiring device in the recessed floor fitting;
- the label holder extends along the first axis between the first knock out and the second knock out.

28. The subplate of claim 25, wherein the identification system further includes a label removably received in the label holder, the label is a paper slip and includes a first indicia corresponding to the wiring device to provide information about the wiring device, the first indicia being an ink marking.

29. The subplate of claim 25, wherein the label holder includes a first tab oriented parallel to the first axis, a second tab oriented parallel to the first axis, and a recessed surface formed between the first tab and the second tab, wherein the first tab and the second tab are configured to hold a label against the recessed surface.

30. The subplate of claim 25, wherein the main plate is asymmetric about the first axis.

* * * * *